United States Patent [19]

Kosaka et al.

[11] Patent Number: 4,931,857
[45] Date of Patent: Jun. 5, 1990

[54] VOLTAGE CONTROLLED COMB FILTER

[75] Inventors: Yositeru Kosaka, Zushi; Kunio Yamada, Tokyo, both of Japan

[73] Assignee: Victor Company of Japan, Ltd., Yokohama, Japan

[21] Appl. No.: 212,059

[22] Filed: Jun. 23, 1988

[30] Foreign Application Priority Data

Jun. 23, 1987 [JP] Japan .................. 62-156256

[51] Int. Cl.$^5$ ................. H04N 9/79; H04N 9/78
[52] U.S. Cl. .................... 358/31; 358/329
[58] Field of Search .............. 358/31, 328, 329, 335, 358/340; 360/33.1

[56] References Cited

U.S. PATENT DOCUMENTS

| | | | |
|---|---|---|---|
| 4,143,397 | 3/1979 | Holmes | 358/31 |
| 4,178,606 | 12/1979 | Hirota | 358/328 |
| 4,263,612 | 4/1981 | Gibson et al. | 358/31 |
| 4,524,380 | 6/1985 | Shibata et al. | 358/329 |
| 4,731,674 | 3/1988 | Fukuda et al. | 358/329 X |
| 4,766,486 | 8/1988 | Ozaki | 358/329 X |

FOREIGN PATENT DOCUMENTS

| | | |
|---|---|---|
| 55-32273 | 8/1980 | Japan . |
| 56-9073 | 2/1981 | Japan . |
| 1576551 | 10/1980 | United Kingdom . |
| 2170975 | 8/1986 | United Kingdom . |

*Primary Examiner*—Robert L. Richardson
*Attorney, Agent, or Firm*—Lowe, Price, LeBlanc, Becker & Shur

[57] ABSTRACT

A voltage controlled comb filter comprises a 1 H delay circuit, an inverting circuit, and a mixing circuit. A playback carrier chrominance signal is delayed by the delay circuit for 1 H period and is inverted by the inverting circuit. The playback and delayed playback carrier chrominance signals are inputted to the mixing circuit which mixes these signals in proportion variable in accordance with the degree of a line correlation error signal. Therefore, there is no switching noise inherent in the conventional comb filter having a switch circuit used in a video tape recorder.

4 Claims, 2 Drawing Sheets

VOLTAGE CONTROLLED COMB FILTER

BACKGROUND OF THE INVENTION

1. Field of the Invention

This invention relates to a comb filter, and particularly to a comb filter for deriving a carrier chrominance signal reproduced from a video tape with crosstalk components from adjacent tracks being suppressed according to the amount of line correlation error in a video signal reproducing apparatus such as a video tape recorder or the like.

2. Description of the Prior Art

Various types of comb filters are known which are used for suppressing crosstalk components included in a video signal wherein the PS (phase shift) method is used. The PS method has been described by the assignee of the present invention, in Japanese patent application provisional publication No. 56-9073 (for an NTSC signal) and in Japanese Patent Publication No. 55-32273 (for a PAL signal). FIG. 3 is a block circuit diagram of an example of a prior art comb filter used for suppressing crosstalk components included in a video signal processed in a playback system such as an NTSC system video tape recorder with color blurring on the resultant displayed image being eliminated by selecting either filtered or non-filtered playback carrier chrominance signal according to the degree of error in line correlation between the carrier chrominance signal in successive one horizontal scanning intervals, referred to in the following as the line correlation error.

In a circuit of FIG. 3, a playback luminance signal applied to an input terminal 1 is delayed by a delay circuit 2 having a delay time equal to one horizontal scanning interval (hereinafter referred to as 1 H). The delayed signal and the playback luminance signal are fed to a subtractor 3. The subtractor 3 subtracts the delayed luminance signal from the playback luminance signal. As a result, a signal of line correlation error is detected at an output of the subtractor 3. This signal will be referred to as a line correlation detection error signal. This line correlation detection error signal is fed to a full-wave rectifier 4 which full-wave rectifies the line correlation detection error signal. The rectified signal is formed into a pulse signal for controlling switch circuit 6 by a waveform shaping circuit 5 which includes a level comparator comparing the rectified signal with a predetermined value. The switch circuit 6 transfers only a signal coming to a terminal t1 according to the pulse signal when the amount of the line correlation detection error signal is larger than the predetermined value and transfers only a signal coming to a terminal t2 when the amount of the line correlation detection error signal is smaller than the predetermined value. On the other hand, a playback carrier chrominance signal is applied to the input terminal 7, a delay circuit 8, and a subtractor 9. The delay circuit 8 delays the playback carrier chrominance signal by 1 H and sends a delayed signal to the subtractor 9. The subtractor 9 subtracts the delayed signal from the non-delayed chrominance signal and outputs a signal to the terminal t2. The delay circuit 8 and the subtracter 9 make up a comb filter.

Such a comb filter has a frequency/attenuation characteristic whereby if there is a sufficient degree of line correlation between the carrier chrominance signal in successive 1 H intervals, each component of the carrier chrominance signal having a frequency that is an odd-numbered multiple of fH/2 (where fH is the horizontal scanning frequency) is enhanced. The playback carrier chrominance signal, which has been phase-shifted by 180° between each pair of successive 1 H intervals, is thus enhanced, while the crosstalk components from adjacent tracks which are in-phase in successive 1 H intervals will mutually cancel. A playback carrier chrominance signal with crosstalk components suppressed and a high signal/noise ratio is thereby obtained. Therefore, when the amount of line correlation detection error signal is smaller than the predetermined value, the playback carrier chrominance signal is processed through the comb filter for removing crosstalk components and the subtractor 9 sends the processed carrier chrominance signal to an output terminal 10 through the terminal t2. On the other hand, when the amount of the line correlation detection error signal is larger than the predetermined value the playback carrier chrominance signal is sent to the terminal 10 through the terminal t1 without passing through the above-mentioned comb filter.

The reason for providing the switch circuit 6 is as follows:

There is a problem that the playback carrier chrominance signal processed through the comb filter reproduces a displayed image with color blurring when the degree of line correlation is low. Such problem affects more heavily the image quality compared with the crosstalk problem when the degree of line correlation is low.

Therefore, when the degree of line correlation is low the playback carrier chrominance signal is by-passed the comb filter and not processed through the comb filter.

However, with the prior art comb filter described above, since the luminance signal may vary slightly around the predetermined value, unnecessary switching occurs. Such switching causes switching noise. Therefore, in the prior art comb filter, there is a drawback that the switching noise is conspicuous on the displayed image.

SUMMARY OF THE INVENTION

The present invention has been developed in order to remove the above-described drawback inherent in the conventional comb filter and contemplates to provide a comb filter which removes the noise appearing on the displayed image due to the switching with the structure that a mixing circuit mixes the playback carrier chrominance signal and the delayed chrominance signal in continuously variable proportion, or the structure that the mixing circuit varies the attenuation of a comb filter continuously.

It is, therefore, an object of the present invention to provide a new useful comb filter which is capable of effectively removing crosstalk components from the playback carrier chrominance signal without producing switching noise on the resultant displayed image, and thereby improving picture quality.

According to a feature of the present invention, the playback carrier chrominance signal is processed by a voltage controlled comb filter comprising a delay circuit responsive to the carrier chrominance signal and a mixing circuit responsive to the carrier chrominance signal and the delayed carrier chrominance signal for combining the carrier chrominance signal with the delayed carrier chrominance signal in proportion variable in accordance with an external signal such as the line correlation detection error signal.

In accordance with the present invention there is provided a voltage controlled comb filter for a video signal, comprising: delay means responsive to an input signal for delaying said input signal for a predetermined period of time; and variable mixing means responsive to said input signal and to an output signal from said delay means for combining said input signal with said output signal in a proportion variable in accordance with a control signal.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Figure 1:
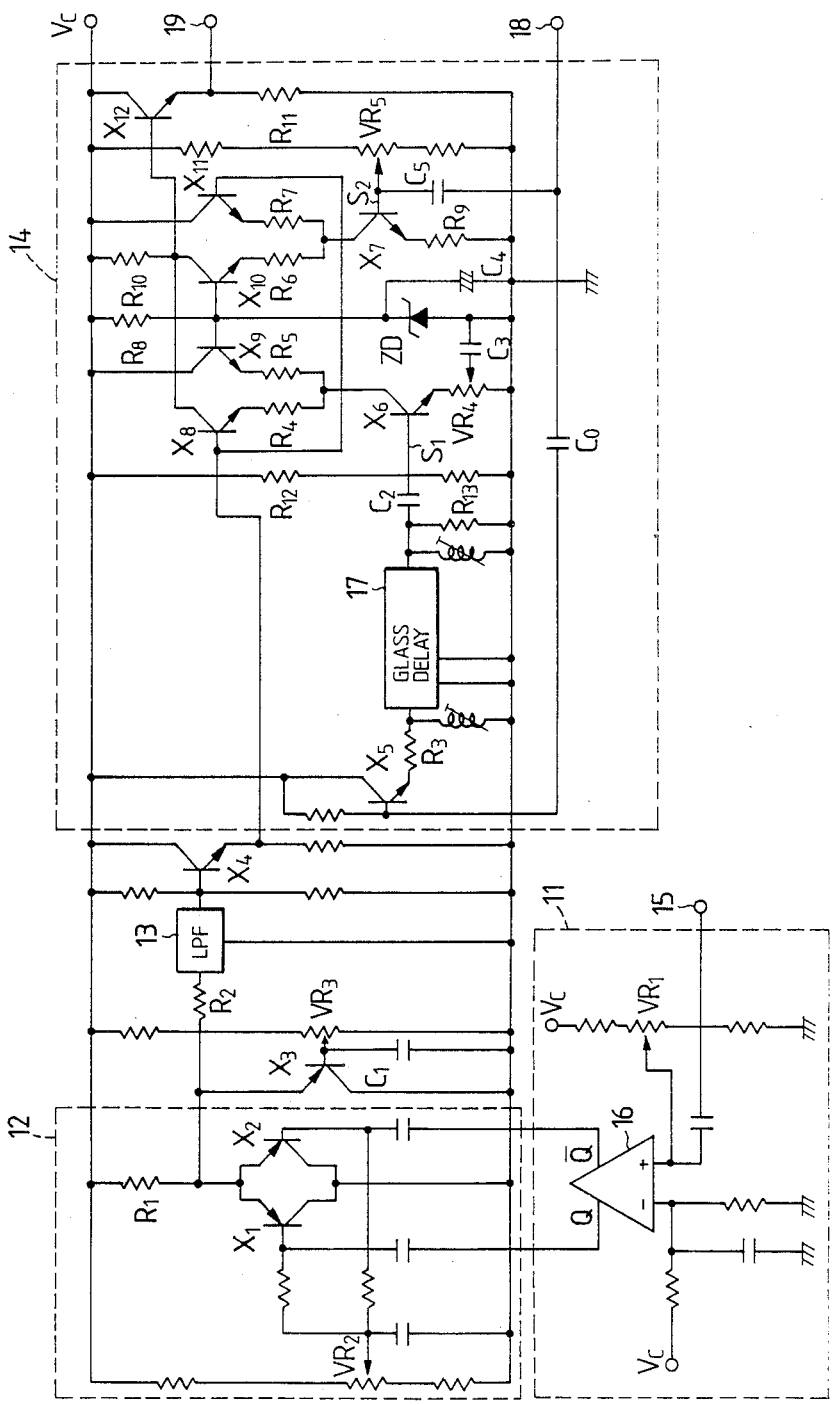
FIG. 1 is a circuit diagram of an embodiment of the voltage controlled comb filter according to the present invention.

Referring to FIG. 1, a schematic circuit diagram of an embodiment of a comb filter according to the present invention is shown together with its peripheral circuits. In FIG. 1, numeral 14 indicates a voltage controlled comb filter according to the present invention which is applied to a playback carrier chrominance signal processing circuit of a VTR.

Figure 3:
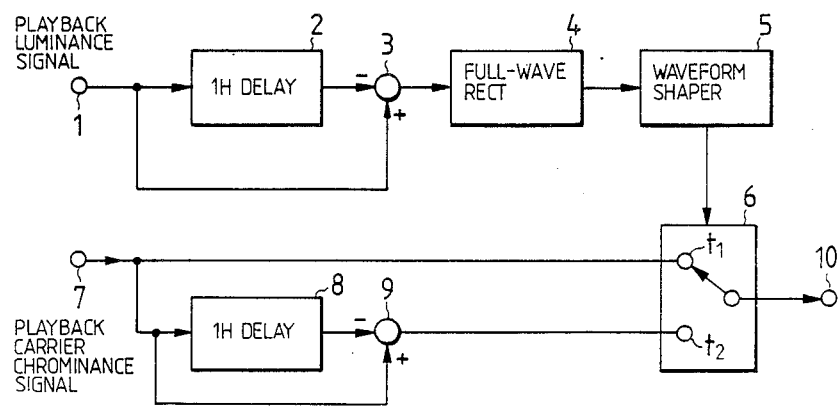
FIG. 3 is a block circuit diagram of an example of a conventional comb filter circuit.

A line correlation detection error signal which is obtained from a playback luminance or playback carrier chrominance signal is applied to an input terminal 15 and playback carrier chrominance signal is applied to an input terminal 18. The playback luminance signal has been obtained by frequency demodulation of frequency modulated luminance signal recorded on a magnetic tape. The playback carrier chrominance signal has been obtained by frequency upconversion of the down shifted carrier chrominance signal recorded on the magnetic tape together with the luminance signal, with phase shift processing having been implemented such that phase inversion of the carrier chrominance signal occurs for successive lines, i.e. successive 1 H intervals, while a constant phase relationship is maintained for the crosstalk components of that chrominance signal for successive lines. The line correlation detection error signal is detected from a playback luminance signal or playback carrier chrominance signal by a well-known line correlation error detection circuit such as a circuit comprising 1 H delay circuit 2, and a subtractor 3 shown in FIG. 3 illustrating a conventional chrominance signal processing circuit.

The line correlation detection error signal is inputted to differential amplifier circuit 11 through an input terminal 15. The line correlation detection error signal is fed, through a capacitor, to the non-inverting input of an operational amplifier 16 which can be used at a frequency range of video signals. The non-inverting input of the operational amplifier 16 is connected to a bias potential adjusted by a potentiometer VR1 which is interposed between a supply voltage Vc and ground potential through resistors as shown.

The operational amplifier 16, i.e., a differential amplifier, amplifies a voltage difference between the non-inverting and inverting inputs and outputs a signal of the amplified voltage difference which is in phase with the input signal thereof at a non-inverted output Q and outputs an inverted signal at an inverted output $\overline{Q}$. Therefore, the output signal from the output Q and the output signal from the output $\overline{Q}$ are in inverted relation each other, or the output $\overline{Q}$ is shifted by 180° compared with the output Q. The signal from the output Q is fed to a base of a PNP transistor X1 and the signal from the output $\overline{Q}$ is fed to a base of a PNP transistor X2. Bases of the transistor X1 and X2 are biased under control by a potentiometer VR2.

In the absence of the above-mentioned line correlation detection error signal at the input terminal 15, the operational amplifier 16 outputs no signal at outputs Q and $\overline{Q}$. Therefore, it causes DC voltages of emitters of transistors X1 and X2 to reach max values. However, during the line correlation detection error signal appears at the input terminal 15, since the Q and $\overline{Q}$ outputs with an inverse relation each other are applied to the bases of transistors X1, X2, either of transistors X1, X2 turns on whoes base is at a lower potential than an emitter potential thereof. Then an emitter current flows through either of transistors X1, X2. Therefore, a full-wave rectified signal is obtained whose potential corresponds to the level of the above-mentioned line correlation detection error signal at a junction of emitters of the transistor X1, X2, and a resistor R1. As mentioned above, the transistors X1, X2 operate in a complementary manner each other and thus make up a full-wave rectifier circuit 12.

A PNP transistor X3, a capacitor C1, and a potentiometer VR3 make up a limiter. When the emitter potential of the transistor X3 is higher than a predetermined value, the transistor X3 turns on, limiting amplitude of the signal from the junction. The limiting value can be changed with the potentiometer VR3. The full-wave rectified line correlation detection error signal occuring at the junction of the emitters of transistors X1, X2 and the resistor R1 is fed to a low-pass filter (LPF) 13 through a resistor R2. Envelope components are extracted by the low-pass filter 13 from the full-wave rectified line correlation detection error signal.

DC output potential of the low-pass filter 13 reaches the max value in the absence of the line correlation detection error signal at the input terminal 15. Higher the degree of the line correlation detection error signal, lower the DC output potential of the low-pass filter 13. The output of the low-pass filter 13 is fed to the base of an NPN transistor X4. The transistor X4 outputs a signal at the emitter thereof which is a low impedance current source. The signal from the emitter is fed to bases of NPN transistors X8, X11 respectively as a control signal which make up a voltage controlled comb filter 14 of an embodiment according to the present invention.

The voltage controlled-comb filter 14 has a structure as follows:

A base of NPN transistor X5 is connected to an input terminal 18 through a capacitor C0 and the supply voltage Vc is applied to the collector thereof. The transistor X5 sends a signal to an input of a glass delay (acoustic transducer) circuit 17 through a resistor R3. In NTSC system, the glass delay circuit 17 has 1 H delay time and also operates as an inverter because of the above-mentioned phase shift processing of the carrier chrominance signal. Therefore, for utilizing line correlation, if the delay time is 2 H, the output signal is not inverted. In PAL system, the glass delay circuit 17 has 2 H delay time and also operates as an inverter. Similarly, if the delay time is 4 H in PAL system, the output signal is not inverted. The glass delay circuit 17 sends a signal to a base of an NPN transistor X6 through a capacitor C2.

The emitter of the transistor X6 is connected to ground potential through a potentiometer VR4 and the collector thereof is connected to the emitter of the NPN transistor X8 through a resistor R4 and to the emitter of an NPN transistor X9 through a resistor R5. The slider of the potentiometer VR4 is connected to ground potential through a capacitor C3. The supply voltage Vc is applied to the collectors of the NPN transistors X8 and X10 through a resistor R10. The bases of the transistors X8, X11 are connected to the emitter of the transistor X4 of the previous stage. The sum of voltage drops due to both the collector currents of the transistors X8, X10 appears across the resistor R10. The supply voltage Vc is applied to the collector of the transistor X9 directly. The base of the transistor X9 is connected to the base of the transistor X10 and to the supply voltage Vc through a resistor R8 together with the base of the transistor X10, and also connected to the cathode of a Zener diode ZD. The anode of the Zener diode ZD is connected to ground potential and a capacitor C4 is connected in parallel with the Zener diode ZD. The Zener diode ZD operates to keep the bases of X9, X10 at a fixed potential.

The base of an NPN transistor X7 is connected to the slider of a potentiometer VR5 and to the input terminal 18 through a capacitor C5. The potentiometer VR5 is provided to set a base potential of the transistor X7. The collector of the transistor X7 is connected to the emitter of the NPN transistor X10 through a resistor R6 and the emitter of the NPN transistor X11 through a resistor R7. The emitter of the transistor X7 is connected to ground potential through a resistor R9.

The base of an NPN transistor X12 is connected to the junction of collectors of transistors X8, X10 and the resistor R10. The supply voltage Vc is applied to the collector of the transistor X12. The emitter of the transistor X12 is connected to ground potential through a resistor R11 and connected to an output terminal 19.

Hereinbelow will be described the operation of this voltage controlled comb filter 14.

A playback carrier chrominance signal incoming from the input terminal 18 is fed to the base of the transistor X5 and to the capacitor C5. The playback carrier chrominance signal is fed to the input of the glass delay circuit 17 through the emitter of the transistor X5 and the resistor R3. The glass delay circuit 17 delays the playback carrier chrominance signal for a predetermined period and inverts the signal (i.e. phase shifted by 180°), then the delayed playback carrier chrominance signal is fed to the base of the transistor X6 through a capacitor C2. This signal is referred to as signal S1. On the other hand, the playback carrier chrominance signal incoming from the input terminal 18 is fed to the base of the transistor X7 through the capacitor C5 and is referred to as signal S2.

Figure 2:
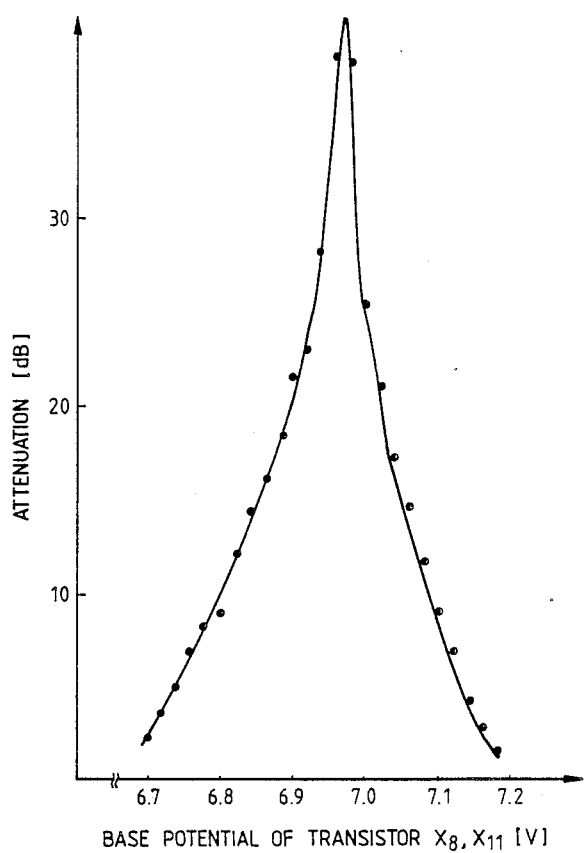
FIG. 2 is a chart of attenuation characteristic of the comb filter of an embodiment of the present invention.

The potentiometer VR2 is so adjusted as to equalize the base potential of the transistors X8, X11 to the base potential of the transistors X9, X10 which is determined by the Zener diode ZD, in the absence of the line correlation detection error signal at the base of the transistor X8. In FIG. 2, the maximum comb filter attenuation which is a peak of an attenuation characteristic described later is obtained by such adjustment of the potentiometer VR2. Then a potentiometer VR4 is adjusted to change a gain of the transistor X6.

Here, the resistor R9 has a fixed value. Therefore, the gain of a second amplifier comprising the transistors X7, X10, resistors R9, and R10 is set at a fixed value. The gain is determined by resistance of the resistors R9, R10. On the other hand, the emitter of the transistor X6 is connected to the potentiometer VR4. Therefore, the gain of a first amplifier comprising the transistors X6, X8, the resistor R10, and the potentiometer VR4 is adjusted by the potentiometer VR4. This adjustment is provided to equalize the output level of the first amplifier responsive to the delayed playback carrier chrominance signal S1 incoming to the base input of the transistor X6 to that of the second amplifier responsive to the playback carrier chrominance signal S2 incoming to the base input of the transistor X7, compensating for an attenuation by 12 to 20 dB due to the glass delay circuit 17.

However, if the potentiometer VR4 is simply provided to the circuit in series, DC output potential of the circuit varies, and thus a signal level ratio of both the transistors X8, X10 varies. Accordingly, DC output potential at the output terminal 19 varies. Therefore, in this embodiment a capacitor C3 is connected between the slider of the potentiometer VR4 and ground potential so that only the AC gain of the first amplifier can be adjusted and the DC gain thereof does not change. As a result, the DC potential at the output terminal 19 does not change.

Emitter currents of the transistors X8, X9 are controlled by the signal S1 amplified by the transistor X6.

Similarly, emitter currents of the transistors X10, X11 is controlled by the signal S2 amplified by the transistor X7.

As mentioned above, in the absence of the line correlation detection error signal, the base potential of the transistor X8, X11 is equal to that of the transistors X9, X10. Therefore, the voltage difference across the resistor R10 results from an algebraic sum of the voltage drops due to the signal S1 and the signal S2 in mutually equal proportions. Increasing the level of line correlation detection error signal from this state reduces the base potential of the transistors X8, X11.

More specifically, the first amplifier circuit is formed of transistors X8, X9 having respective emitters connected through resistors R4, R5 to the collector of the transistor X6. The total DC current flow through transistors X8, X9 is determined by the DC potential of the base of transistor X6 (fixed by a resistor pair R12, R13) and the resistance value of the potentiometer VR4 which is connected between the emitter of transistor X6 and ground. The second amplifier circuit is formed of transistors X10, X11 having respective emitters connected through resistors R6, R7 to the collector of the transistor X7. The total DC current flow through transistors X10, X11 is determined by the DC potential of the base of transistor X7 (set by the potentiometer VR5) and the resistance value of the resistor R9 connected between the emitter of transistor X7 and ground. That is, increase in voltage difference between base and emitter of the transistor X10 corresponds decrease in voltage difference between base and emitter of the transistor X8, in other words, the transitors X8 and X11 operates in a complementary manner. Therefore, the algebraic sum of voltage drops due to collector currents of the transistors X8, X10 represents combining (mixing) of the input signals S1 with S2. Thus, the circuit comprising the transistor X6, X7, X8, X9, X10, and X11 and the resistor R10 operates as a mixing circuit in a proportion determined by potential of an external signal incoming from the transistor X4.

Such circuit is also considered as a circuit comprising a first voltage controlled variable gain amplifier (VCA) including the transistors X6, X8, and X9; a second VCA including the transistors X7, X10, and X11; and an adding circuit comprising the resistor R10. However, these gain is complementary and the adding circuit also operates as a subtractor in consideration of the delay circuit 17 for compensation of phase relation between signals S1 and S2.

Larger the error signal level of line correlation, lower the proportion of delayed playback carrier chrominance signal S1 to playback carrier chrominance signal S2. The comb filter 14 shows low degree of attenuation in characteristic of comb filter when the line correlation detection error signal is low. In other words, in this state the comb filter 14 shows such an attenuation characteristic that "valleys" of the comb filter frequency response curve become more shallow.

The voltage drop of the resistor R10 is fed to the base of the transistor X12, and is sent to the terminal 19 through the emitter thereof.

Here, the input playback carrier chrominance signal S2 and delayed playback carrier chrominance signal S1 are added to each other at the resistor R10. However, the adding circuit, i.e., the resistor R10, operates as a subtracter actually, because the delayed carrier chrominance signal is inverted in level by the glass delay circuit 17 in the case that the delay time is 1 H in NTSC system. The Resistor R10 as a subtracter is refered to as the adding circuit 9 of FIG. 3 in phase relation.

FIG. 2 shows attenuation characteristic of the voltage controlled comb filter 14 of this embodiment. In FIG. 2, the axis of abscissa represents base potentials of the transistors X8, X11; the axis of ordinate, attenuation of voltage controlled comb filter 14. As seen in FIG. 2, attenuation reaches the peak around 6.97 V of base potential. In other words, in this state the comb filter 14 shows such an attenuation characteristic that "valleys" of the comb filter frequency response curve become deeper.

In FIG. 2, attenuation decreases with increase in voltage difference between the base potential of the transistors X8, X11 and the peak value of 6.97 V. Therefore, in this embodiment in order to utilize a portion of the attenuation characteristic which corresponds to the base potentials of the transistors X8, X11 lower than 6.97 V, the external control signal level is limited to the value of 6.97 V by a limiter comprising the above-mentioned transistor X3, capacitor C1, and potentiometer VR3.

In the above-mentioned embodiment of FIG. 1, continuous variation in attenuation in accordance with the line correlation detection error signal eliminates the necessity of the switch. As a result of it, there is no switching noise inherent in the conventional comb filters.

The above-described embodiment is just an example of the present invention, and therefore, it will be apparent for those skilled in the art that many modifications and variations may be made without departing from the scope of the present invention.

What is claimed is:

1. A comb filter, comprising:
   (a) delay means responsive to an input signal for delaying said input signal for a predetermined period of time; and
   (b) variable mixing means responsive to said input signal and to an output signal from said delay means for combining said input signal with said output signal in a proportion variable in accordance with a control signal,
   wherein said mixing means comprises a first voltage controlled amplifier for amplifying said input signal with a first gain variable in accordance with said control signal and a second voltage controlled amplifier for amplifying said output signal with a second gain variable in accordance with said control signal, the first and second variable gains having a complementary relation to each other, and an adding circuit for adding an output signal from said first voltage controlled amplifier to an output signal from said second voltage controlled amplifier.

2. A comb filter as claimed in claim 1, wherein said delay means is capable of outputting an inverted signal so that said output signal is subtracted from said input signal.

3. A comb filter as claimed in claim 1 wherein said first signal is a composite video signal and said predetermined period corresponds to a duration between two consecutive horizontal synchronous pulses.

4. A comb filter as claimed in claim 1 wherein said delay means is a glass delay circuit.

* * * * *